United States Patent [19]  [11] 4,250,283
Caunt et al. [45] Feb. 10, 1981

[54] TITANIUM TRIHALIDE COMPOSITION

[75] Inventors: Anthony D. Caunt, Welwyn Garden City, England; James F. R. Jaggard, Bad Kissingen, Fed. Rep. of Germany

[73] Assignee: Imperial Chemical Industries Limited, London, England

[21] Appl. No.: 549,301

[22] Filed: Feb. 12, 1975

[30] Foreign Application Priority Data

Feb. 12, 1974 [GB] United Kingdom ................. 6240/74
Nov. 18, 1974 [GB] United Kingdom ............... 49734/74

[51] Int. Cl.³ .......................... C08F 4/66; C08F 10/06
[52] U.S. Cl. ................... 526/77; 252/429 B; 252/429 C; 526/128; 526/139; 526/140; 526/141; 526/142; 526/153
[58] Field of Search ...................... 252/429 B, 429 C; 260/93.7, 94.9 C, 94.9 E; 526/153, 159, 139, 140, 141, 142, 143, 77, 128

[56] References Cited

U.S. PATENT DOCUMENTS

| 3,058,963 | 10/1962 | Vandenberg | 260/94.9 E |
|---|---|---|---|
| 3,058,970 | 10/1962 | Rust et al. | 526/159 |
| 3,213,073 | 10/1965 | Coover et al. | 526/139 |
| 3,328,375 | 6/1967 | Price | 260/94.9 C |
| 3,357,967 | 12/1967 | Wesslon | 260/94.9 E |
| 3,732,197 | 5/1973 | Kitagawa | 526/143 |
| 3,752,797 | 8/1973 | Gordon et al. | 260/94.9 C |
| 3,825,524 | 7/1974 | Wada et al. | 260/94.9 E |
| 3,960,765 | 6/1976 | Shiga et al. | 526/141 |
| 4,007,132 | 2/1977 | Rust et al. | 526/142 |

FOREIGN PATENT DOCUMENTS 2243459 3/1973 Fed. Rep. of Germany.
861452 2/1961 United Kingdom.

Primary Examiner—Edward J. Smith
Attorney, Agent, or Firm—Cushman, Darby & Cushman

[57] ABSTRACT

A titanium trihalide component of an olefine polymerization catalyst is prepared by reacting together a titanium tetrahalide and an organo-aluminium compound, and treating the solid reaction product with a hydrocarbon solution of an alkyl aluminium dihalide. It is preferred that the solid reaction product is treated with a complexing agent, particularly an ether such as di-isoamyl ether before contacting with the alkyl aluminium dihalide. The titanium trihalide can then be used together with an organo-metallic compound to polymerize an olefine monomer, particularly propylene. The catalyst system may include further components in addition to the titanium trihalide and organo-metallic compound.

19 Claims, No Drawings

TITANIUM TRIHALIDE COMPOSITION

The present invention relates to the preparation of titanium halide compounds which are suitable for use as components of an olefine polymerisation catalyst.

Olefine monomers such as propylene can be polymerised using catalysts comprising a transition metal compound and an organo-metallic compound. The transition metal compound is usually a solid compound if crystalline propylene polymers are being prepared and typically the transition metal compound is a titanium trihalide, especially titanium trichloride. Various forms of titanium trichloride can be used and these may be obtained by the reduction of titanium tetrachloride using various reducing agents such as hydrogen, titanium metal, aluminum metal, organo-aluminum compounds or organo compounds of the non-transition metals or silicon. In many cases the titanium trichloride is not a pure material but includes compounds of other metals such as, for example aluminum chloride or organo-aluminium chlorides. The activity and stereospecificity of the catalyst system is dependent on the form of titanium trichloride present in the catalyst.

According to the present invention there is provided a process for the preparation of a titanium trihalide wherein a titanium tetrahalide is reacted with an organo-aluminium compound to give a titanium trihalide product and this product is treated with a solution, in a liquid hydrocarbon, of an alkyl aluminium dihalide, the amount of the alkyl aluminium dihalide being from 0.1 up to 100 moles per mole of titanium trihalide present in the titanium trihalide product.

It is preferred that the amount of alkyl aluminium dihalide is from 1 up to 10, particularly from 2 up to 8 moles per mole of titanium trihalide present in the titanium trihalide product.

The concentration of the alkyl aluminium dihalide is conveniently in the range from 0.1 up to 5, preferably from 0.5 up to 3.5, moles of alkyl aluminium dihalide per liter of the liquid hydrocarbon.

The titanium tetrahalide which is reacted with the organo-aluminium compound is preferably titanium tetrachloride when the product will be a titanium trichloride containing material.

The organo-aluminium compound is conveniently an aluminium alkyl of the formula

where
R is an alkyl group having 1 to 18 carbon atoms;
X is a halogen atom; and
n is a number such that $0 < n \leq 3$.

Preferably n is from 1.5 up to 2.5, especially 1.5 up to 2.0. The reaction between the titanium tetrahalide and the organo-aluminium compound is preferably carried out by mixing the two components, especially by adding the aluminium compound to the titanium tetrahalide, at a relatively low temperature, for example below about 20° C., very conveniently at 0° C. The time of mixing of the components will be dependent on the reaction conditions and the reactants used, however, times of 30 minutes to 16 hours, preferably 2 to 10 hours, can be used. When the organo-aluminium compound is a dialkyl aluminium halide, or a material including a dialkyl aluminium halide, we prefer to use from 0.6 up to 1.5 moles, for example 1.0 mole of dialkyl aluminium halide, for each mole of titanium tetrahalide.

The alkyl aluminium dihalide can be isohexyl aluminium dichloride, isobutyl aluminium dichloride or, preferably, ethyl aluminium dichloride.

Contacting of the titanium trihalide with the solution of the alkyl aluminium dihalide is preferably effected by mixing at ambient temperature and heating to an elevated temperature in the range from 60° up to 120° C. for a length of time, at the elevated temperature, of from 10 minutes up to 100 hours. The length of time required for the contacting will be dependent on the temperature used, less time being required at the higher temperatures. We particularly prefer to use temperatures from 80° up to 110° C. for times of from one hour up to 20 hours.

The treatment of the titanium trihalide product with the solution of the alkyl aluminium dihalide produces a titanium trihalide product which can be used to give polymerisation catalysts which show improved polymerisation activity and stereospecificity compared to an untreated reaction product.

We have found that further improvements can be obtained if the reaction product is treated with a complexing agent before it is treated with the solution of the alkyl aluminium dihalide.

Thus, according to a preferred aspect of the present invention there is provided a process for the preparation of a titanium trihalide wherein a titanium tetrahalide is reacted with an organo-aluminium compound to give a titanium trihalide product, the product is treated with a complexing agent and then with a solution, in a hydrocarbon liquid, of an alkyl aluminium dihalide, the amount of the alkyl aluminium dihalide being from 0.1 up to 100, preferably from 1 up to 10, moles per mole of titanium trihalide in the titanium trihalide product. After the titanium tetrahalide has been reacted with the organo-aluminium compound, it is preferred to separate the titanium trihalide product from the reaction medium. It is also preferred to effect similar separation after the reaction of the titanium trihalide product with the complexing agent and again after treatment with the solution of the alkyl aluminium dihalide. Preferably the separation steps each include at least one washing stage.

The complexing agent is one which is capable of forming complexes with one or more of the components of the titanium trihalide product. Typical complexing agents are organic compounds containing one or more atoms or groups which have one or several free electron pairs capable of co-ordination with one of the constituents of the reaction product. Such compounds conveniently include a non-metallic element of Group V or VI of the Periodic Table, for example ethers, thioethers, thiols, phosphines and amines. It is particularly preferred to use as complexing agents ethers, thioethers and thiols of the formulae:

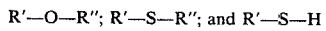

where R' and R" which may be the same or different are hydrocarbyl groups having from 1 to 15 carbon atoms. We have found that the ethers, especially those wherein each hydrocarbyl group is an alkyl group containing from 4 to 10 carbon atoms or particularly 4 to 6 carbon atoms, such as di-n-butyl ether or di-iso-amyl ether, give particularly useful forms of the titanium trihalide. The amount of complexing agent used will be dependent on the particular compound used but, in general, for each mole of titanium trihalide which is present in the titanium trihalide product, there is used at least 0.4 moles, and preferably 0.8 moles, for example 1.0 moles of the complexing agent, but no significant improvement in the catalyst properties are achieved when using proportions in excess of 3 moles of complexing agent for each mole of titanium trihalide.

Thus, according to a particularly preferred aspect of the present invention, a titanium trichloride product is prepared by reacting together titanium tetrachloride and an organo-aluminium compound of formula

$$AlR_{n1}X_{3-n1}$$

at a temperature not exceeding 20° C., separating the titanium trichloride product from the reaction medium, treating the titanium trichloride product with an ether of formula

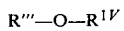
$$R'''-O-R^{IV}$$

separating off any excess ether, and contacting the treated solid with a solution in a hydrocarbon liquid of an alkyl aluminium dichloride in an amount of from 1 up to 10 moles of the alkyl aluminium dihalide for each mole of titanium trichloride in the treated solid, contacting being effected by heating to a temperature in the range from 60 up to 120° C. for from 10 minutes up to 100 hours, and wherein R is an alkyl group having 1 to 18 carbon atoms;
X is a halogen atom;
R''' and $R^{IV}$ can be the same or different and are alkyl groups containing from 4 up to 10 carbon atoms; and
$n_1$ is from 1.5 up to 2.0.

It will be appreciated that the titanium trihalide as prepared in accordance with the foregoing procedure is not a pure titanium trihalide but also contains other materials which may be complexed with the titanium trihalide, such other materials including aluminium halides and hydrocarbyl aluminium halides and residual amounts of the complexing agent.

Titanium trihalides prepared as described herein can be used together with one or more other components to give an olefine polymerisation catalyst. Thus, an olefine polymerisation catalyst comprises (1) a titanium trihalide component which is the product of reacting a titanium tetrahalide with an organo-aluminium compound to give a titanium trihalide product, and treating the titanium trihalide product with a solution in a hydrocarbon liquid, of an alkyl aluminium dihalide in the proportion of from 0.1 up to 100 moles of the alkyl aluminium dihalide for each mole of titanium trihalide present in the titanium trihalide product and optionally also treating the titanium trihalide product with a complexing agent before the treatment with the solution in a hydrocarbon liquid, of an alkyl aluminium dihalide, and (2) at least one organo-metallic compound of aluminium or of a non-transition metal compound of Group IA or IIA.

The catalyst optionally also includes
(3) at least one Lewis Base component and/or
(4) at least one substituted or unsubstituted polyene.

The organo-metallic compound can be Mg(C₆H₅)₂ or a Grignard reagent which is substantially ether free. Alternatively the organo-metallic compound can be a complex of an organo-aluminium compound and an organo-metallic compound of Groups IA or IIA such as lithium aluminium tetraalkyl or Mg(AlEt₄)₂. It is preferred that the organo-metallic compound is an organo-aluminium compound such as an aluminium hydrocarbyl sulphate, an aluminium hydrocarbyl oxyhydrocarbyl, or particularly a dihydrocarbyl aluminium halide or an aluminium trihydrocarbyl. The hydrocarbyl group is conveniently an alkyl group such as ethyl. Mixtures of organo-aluminium compounds may be used such as a mixture of an aluminium trihydrocarbyl and an aluminium dihydrocarbyl halide for example aluminium triethyl and diethyl aluminium chloride. It is preferred that the organo-compound is halogen-free and is, in particular, an aluminium trihydrocarbyl.

The optional component (3) of the catalyst is a Lewis Base of the type which is effective to alter the activity and/or stereospecificity of the catalyst system. A wide range of such Lewis Bases have been proposed which have such an effect and these include the amines, particularly the cyclic amines such as pyridine, quinoline, isoquinoline and alkyl substituted derivatives of these compounds; diamines such as N,N,N',N'-tetramethylethylenediamine; alkanolamines such as N,N-dimethyl-N-ethanolamine; amides; urea and thiourea and the substituted derivatives thereof such as N,N,N',N'-tetramethylurea; organo-phosphorus compounds including the phosphites, phosphates, phosphines and phosphine oxides such as triphenyl phosphine oxide, bis(-dimethylamino)ethoxy phosphine oxide and hexamethylphosphoric triamide; ethers; esters such as methylmethacrylate; ketones; alcohols; the sulphur containing analogues of the ethers, esters, ketones and alcohols and organo-silicon compounds such as the silanes and siloxanes. Catalyst systems including Lewis Base compounds or complexes including Lewis Base compounds are disclosed, inter alia, in British Patent Specifications Nos. 803 198; 809 717; 880 998; 896 509; 920 118; 921 954; 933 236; 940 125; 966 025; 969 074; 971 248; 1 013 363; 1 049 723; 1 122 010; 1 150 845 and 1 208 815; Dutch Patent Application No. 70 15555 and German Patent Application No. 2 130 314. Of the Lewis Bases which can be used in the catalyst of the present invention the organo-phosphorus compounds particularly the phosphine oxide derivatives such as hexamethylphosphoric triamide are particularly useful.

Other Lewis Bases which may very conveniently be used are phosphorus compounds selected from materials of the formulae:

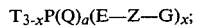
$$T_{3-x}P(Q)_a(E-Z-G)_x; \qquad (a)$$

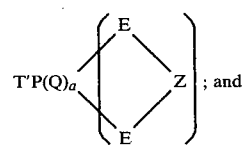
$$T'P(Q)_a \left( \begin{array}{c} E \\ \diagdown \\ \diagup \\ E \end{array} Z \right) ; \text{ and} \qquad (b)$$

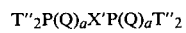
$$T''_2P(Q)_aX'P(Q)_aT''_2 \qquad (c)$$

wherein
each T is independently halogen, a hydrocarbyl group, a group —NT'''₂ or —OT''', or a heterocyclic group;
T' is T or a group (E—Z—G);
T'' is T' or both the T'' groups which are attached to the same P atom together to form a group

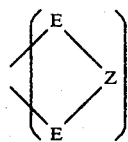

T'''' is a hydrocarbyl group;
X' is —O—, -NT''''''-, —E(CH$_2$)$_m$E— or

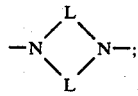

T''''' is a hydrogen atom or T'''',

L is a bivalent hydrocarbyl radical and each L may be the same or different;

each E is —O—, —S— or —NT'''— and may be the same or different;

G is —OT''', —ST''', —NT'''$_2$, —PT'''$_2$ or a heterocyclic ring system whereof the hereroatom is O, S, N or P;

Q is an oxygen or sulphur atom;

Z is a bivalent hydrocarbyl radical such that E and G or E and E are separated by not more than 3 carbon atoms;

each a is independently zero or 1;

m is a positive integer, and x is 1, 2 or 3.

In the phosphorus compounds of the type (a), (b) and (c), the groups T and T'' attached to a given phosphorus atom are conveniently the same. In compound (c) it is particularly convenient if all the groups T'' are the same. The groups T, T' and T'' can be alkylamino groups —NT$_2$''' wherein T''' is an alkyl group such as methyl or ethyl. Alternatively, the groups T, T' and T'' may be heterocyclic groups such as pyridyl, pyrrolyl, pyrrolidyl or piperidyl and may be attached to the phosphorus atom through a carbon or nitrogen atom. If T' or T'' is a group (E—Z—G), this can be a group derived from, for example an hydroxy ether; an N,N-substituted alkanolamine, an N,N,N'-substituted diamine or an N,N-substituted aminothiol group and G can be derived from a heterocyclic compound such as pyridine, quinoline, isoquinoline, etc. If both of the groups T'' attached to the same phosphorus atom together form a group

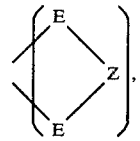

this can be the divalent residue from a glycol, an N-substituted aminoalcohol, an N,N'-substituted diamine or an N-substituted aminothiol. In compounds (a) and (b) it is preferred that a is one and the group Q is oxygen. Conveniently, but not necessarily, in compounds (c) the value of each a is the same, that is both are either zero or preferably one, and similarly it is preferred that both of the groups Q are the same and are oxygen.

In compound (b), it is preferred that at least one of the groups E and E is —NT'''—. If a is zero, that is when the phosphorus is trivalent it is preferred that Group T' is (E—Z—G).

In compound (c), the group X' can be derived from a monoamine or an acyclic or cyclic diamine. If the group X' is of the type —NT'''(CH$_2$)$_m$NT'''—, the group T''' is preferably a hydrocarbyl group such as methyl and m is preferably 2 or 3. If the group X' is of the type

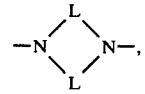

it is preferred that the groups L are both the same and are alkylene groups of the type —(CH$_2$)$_m$—, particularly ethylene groups when X' is derived from piperazine. We have obtained satisfactory polymerisation systems using as the phosphorus compound (c), materials in which the group X' is

—N(CH$_3$)CH$_2$CH$_2$N(CH$_3$)—;

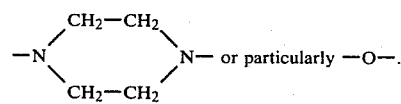

In compound (c) when each a is zero it is preferred either that X' is derived from an acyclic or cyclic diamine or that at least one T'' is a group (E—Z—G).

Phosphorus compounds of the type (a), (b) and (c) which may be used as the third component of the catalyst include compounds of the formulae I to XXVIII.

| | |
|---|---|
| [(CH$_3$)$_2$N]$_2$P(O)N(CH$_3$)CH$_2$CH$_2$N(CH$_3$)$_2$ | I |
| (CH$_3$)$_2$NP(O)[N(CH$_3$)CH$_2$CH$_2$N(CH$_3$)$_2$]$_2$ | II |
| [(CH$_3$)$_2$N]$_2$P(O)OCH$_2$CH$_2$N(CH$_3$)$_2$ | III |
| (CH$_3$)$_2$NP(O)[OCH$_2$CH$_2$N(CH$_3$)$_2$]$_2$ | IV |

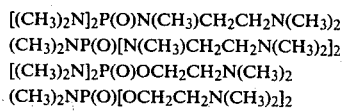

V

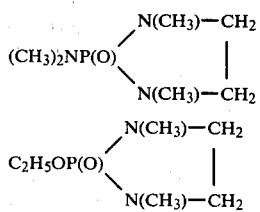

VI

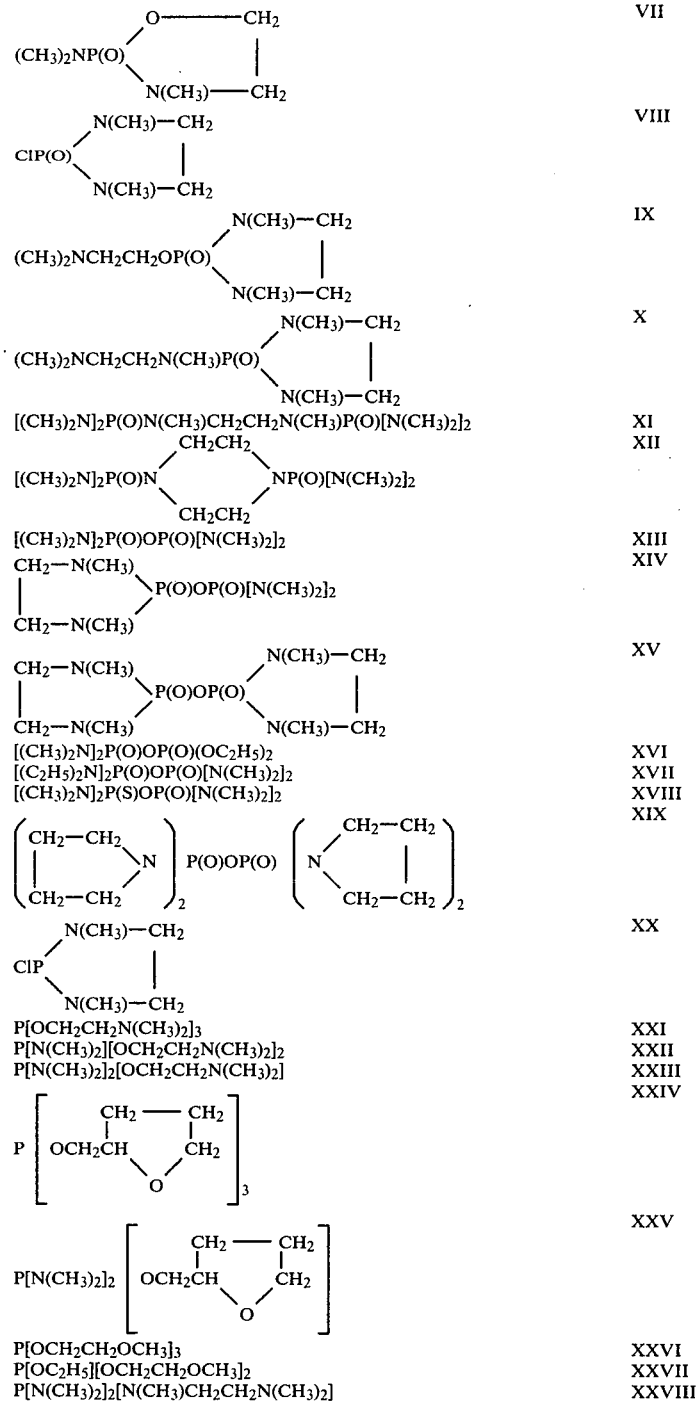

P[OCH₂CH₂OCH₃]₃ XXVI
P[OC₂H₅][OCH₂CH₂OCH₃]₂ XXVII
P[N(CH₃)₂]₂[N(CH₃)CH₂CH₂N(CH₃)₂] XXVIII

It is preferred to use compounds of the formulae I to XIX, for example those of formulae I, V and XIII.

Other Lewis Bases which may be used include organophosphine oxide derivatives wherein at least one group attached to the phosphorus atom is a heterocyclic group containing more than 3 atoms in the ring and attached to the phosphorus atom by a carbon or heteroatom as described in our copending British Patent Application No. 7989/73. Alternatively the Lewis Base may be a phosphine oxide wherein the phosphorus atom is included, together with 3 other heteroatoms, in an endocyclic ring system as described in our copending British Patent Application No. 7988/73.

It will be appreciated that the effect of, and the optimum conditions for using, a Lewis Base will depend on the particular Lewis Base selected.

The catalyst also optionally includes a polyene, the presence of which gives a further improvement in the polymerisation characteristics of the catalyst system. The polyene may be an acyclic polyene such as 3-methylheptatriene-(1,4,6) or may be a cyclic polyene such as cyclooctatriene, cyclooctatetraene or particularly cycloheptatriene or may be a derivative of such polyenes. Such derivatives can be substituted with alkyl or alkoxy groups as in methylcycloheptatriene, dimethylcyclooctatetraene and methoxycycloheptatriene or may be tropylium salts, tropylium complexes, compounds of the type

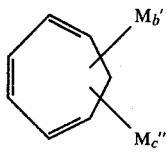

tropolone and its derivatives of the type

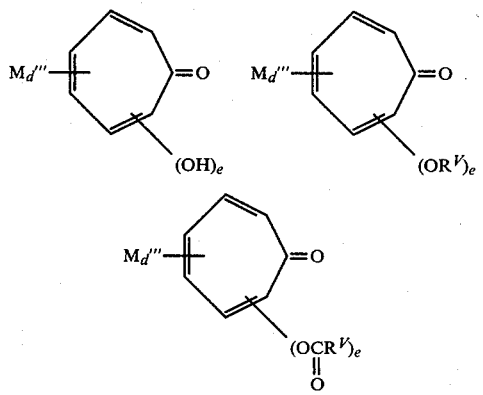

or tropones of the formula

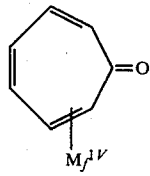

where

M' is a hydrogen, halogen, or a hydrocarbyl group, particularly an alkyl group having 1 to 20 carbon atoms, an aryl group, an aralkyl or alkaryl group wherein the alkyl group has 1 to 20 carbon atoms or a condensed benzene ring having two carbon atoms in common with the cycloheptatriene ring;

M" is a monovalent group containing at least one of the elements N, S or O;

M''' is a hydrocarbyl group of 1 to 20 carbon atoms, halogen or M";

$M^{IV}$ is the same as M' and/or M";

$R^V$ is a hydrocarbyl group having 1 to 20 carbon atoms, which may be substituted with an alkoxy- or a hydrocarbyl-amino group;

b and c are integers wherein $b+c \leq 7$ and usually 2 or less, particularly one;

d and e are integers wherein $d+e \leq 6$; and f is an integer wherein $f \leq 6$.

Tropylium salts and tropylium complexes are salts of cycloheptatriene which may be prepared by the process described in Dolk. akad. Nauk, USSR, 113, page 339 (1957). It will be appreciated that there are many derivatives of the type described including, for example methoxyethyltropylether

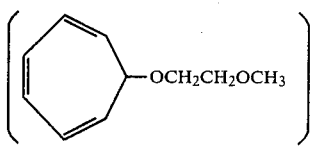

The proportions of the various catalyst components can be varied widely depending both on the materials used and the absolute concentrations of the components. However, in general for each molecular proportion of the titanium trihalide which is component (1) of the catalyst, there is present at least 0.1, and preferably at least 0.5 molecular proportions of component (2), but it may be desirable to use much greater quantities of component (2) for example as many as 50 molecular proportions, or even more, for each molecular proportion of titanium trihalide. In general we prefer to use not more than 25 and particularly not more than 10 molecular proportions of component (2) for each molecular proportion of titanium trihalide. The catalyst also optionally includes from 0.01 to 10 molecular proportions of component (3), and preferably from 0.05 to 5.0, especially from 0.2 up to 2.0 molecular proportions of component (3), with the amount, in moles, of component (3) being less than the amount, in moles, of component (2). The catalyst also optionally can include a polyene and the molar proportions of the polyene plus the Lewis Base should preferably, in total, be less than the molecular proportion of component (2) (the organometallic compound) which is present in the catalyst. For each molecular proportion of component (2), the number of molecular proportions of the polyene is conveniently in the range 0.01 up to 1.0, especially 0.05 to 0.5, for example 0.2.

A preferred catalyst within the present invention comprises (1) one molecular proportion of a solid titanium trichloride containing component which has been obtained by reacting together titanium tetrachloride and an organo-aluminium compound of formula $$AlR_{n1}X_{3-n1}$$

at a temperature not exceeding 20° C., separating the titanium trichloride product from the reaction medium, treating the titanium trichloride product with an ether of formula $$R'''-O-R^{IV}$$

separating off any excess ether, and contacting the treated solid with a solution, in a hydrocarbon liquid, of an alkyl aluminium dichloride in an amount of from 1 up to 10 moles of the alkyl aluminium dihalide for each mole of titanium trichloride present in the titanium trichloride product, contacting being effected by heating to a temperature in the range from 60° up to 120° C. for from 10 minutes up to 100 hours;

(2) from 0.5 up to 25 molecular proportions of a trihydrocarbyl aluminium compound or a dialkyl aluminium halide;

(3) from 0.1 up to 10 molecular proportions of a Lewis Base compound which is an organo-phosphorus compound; and optionally (4) from 0.01 up to 1.0 molecular proportions for each mole of component (2) of a substituted or unsubstituted polyene which is cyclooctatriene, cyclooctatetrene or cycloheptatriene or alkyl or alkoxyl derivatives thereof, wherein the total amount, in moles, of component (3) and, if presnt, component (4) is less than the amount, in moles, of component (2) and wherein R is an alkyl group having 1 to 18 carbon atoms;
X is a halogen atom;
$R'''$ and $R^{IV}$ can be the same or different and are alkyl groups containing 4 to 10 carbon atoms; and
$n_1$ is from 1.5 up to 2.0.

The catalysts of the present invention are particularly suitable for the polymerisation and copolymerisation of mono-α-olefines.

Thus according to a further aspect of the present invention at least one mono-α-olefine, or a mixture of at least one mono-α-olefine and ethylene, is contacted with a polymerisation catalyst comprising (1) a titanium trihalide containing component which has been obtained by reacting a titanium tetrahalide with an organo-aluminum compound to give a titanium trihalide reaction product, optionally treating the titanium trihalide product with a complexing agent, and then treating the product with a solution, in a hydrocarbon liquid, of an alkyl aluminum dihalide, the amount of the alkyl aluminum dihalide being from 0.1 up to 100 moles of alkyl aluminum dihalide per mole of titanium trihalide present in the titanium trihalide product; and (2) at least one organo-metallic compound of aluminium or of a non-transition metal compound of Group IA or IIA; and optionally (3) at least one Lewis Base compound; and optionally (4) at least one substituted or unsubstituted polyene.

Any mono-α-olefine monomer which is capable of being polymerised using a Ziegler catalyst may be polymerised by the process of the present invention. Thus, monomers which can be polymerised by the present process include butene-1, and 4-methylpentene-1 and particularly propylene. The olefines may be copolymerised either together or with ethylene, and such a copolymerisation is conveniently effected using a sequential polymerisation process such as is described in British Patents Nos. 970 478; 970 479 and 1 014 944.

We have found that the process of the present invention can be used for the polymerisation of propylene to give a high yield of polymer relative to the amount of catalyst used and also a relatively low proportion of the undesirable soluble polymer.

It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Zeigler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, we prefer that the monomers and any diluents, which are of commercial purity, are subjected to a further purification procedure.

Any suitable purification treatment can be used and the treatment can be effected in more than one stage if desired. The particular purification treatment used will be dependent on the purity of the starting materials.

Satisfactory purity can be achieved in most cases by passing the monomer (and diluent, if used) through a bed of material which is capable of absorbing the impurities contained in the monomer or diluent, for example as described in British Patent Specifications Nos. 1 111 493 and 1 226 659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of a solid titanium trihalide such as titanium trichloride may be inconvenient, it may be preferred that all of the titanium trihalide is added, together with some of each of the other catalyst components, to initiate polymerisation and the rest of the other catalyst components are added during the polymerisation. It is desirable that in any mixing of the catalyst components if the catalyst includes a Lewis Base component, the titanium trihalide component is not allowed to come into contact with the Lewis Base compound which is component (3) of the catalyst in the absence of the organo-metallic compound which is component (2) of the catalyst.

The polymerisation can be effected in the presence of a chain transfer agent such as hydrogen or a zinc dialkyl, in order to control the molecular weight of the product formed.

Various aspects of the present invention will now be described in more detail in the following illustrative Examples. Except where otherwise indicated, all operations were carried out in a nitrogen atmosphere.

EXAMPLE 1

Preparation of titanium trichloride-containing material 600 milliliters of titanium tetrachloride (5.46 moles) were charged into a 5 liter autoclave containing 2400 milliliters of hexane. The autoclave and its contents were cooled to a temperature of 0° to 1° C., and 5.46 moles of diethyl aluminium chloride were added, as a 47% weight solution in hexane, over a period of four hours whilst maintaining the temperature of 0° to 1° C. The reaction mixture was maintained at 1° C. for a further 15 minutes after the addition had been completed and was then heated to 65° C. over a period of 30 minutes and maintained at that temperature for an hour.

The mixture was cooled to 0° C., and transferred to a flask which was maintained at −10° C. for three weeks. After three weeks, the flask was allowed to warm up to ambient temperature and the supernatant liquor was removed by decantation.

The residual solid was then washed six times by suspending the solid in 3 liter batches of dry, nitrogen-purged hexane and then decanting off the hexane.

Treatment with ethyl aluminium dichloride

A solution in toluene of ethyl aluminium dichloride (concentration 1800 mmol/liter) was added to 30 millimoles of a filtered and dried portion of the reaction product obtained as described above, the ethyl aluminium dischloride being added in a sufficient quantity to give a molar ratio of $TiCl_3/EtAlCl_2$ of 1:2. The mixture was continuously stirred and was heated up to 65° C. over a period of 15 minutes and this temperature was maintained for a further 16 hours. The mixture was filtered, dried in a stream of pure nitrogen at 65° C. and washed twice with 30 ml toluene and twice with 30 ml heptane at 65° C. These washings took 45 minutes. The mixture was allowed to cool to ambient temperature over 1 hour.

For comparative purposes, a further portion of the filtered and dried reaction product was treated similarly except that the treatment with ethyl aluminium dichloride was omitted.

Samples of both titanium trichloride components were then used to polymerise propylene.

The propylene used for the polymerisation had been purified by passing gaseous propylene in turn through a column (3 inches diameter, 3 feet length) containing 1/16 inch granules of Alcoa F1 alumina at 50°–60° C., and then through a similar column containing BTS catalyst (Cupric oxide reduced to finely divided metallic copper on a magnesium oxide support) at 40°–50° C., condensing the issue gas and passing the liquid propylene through four columns (all 3 inches dimaeter; two of 3 feet in length, two of 6 feet in length) at 25° C., each containing 1/16 inch pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methylacetylene etc.) was unchanged at <1 ppm.

A polymerisation flask equipped with efficient stirrer and a water jacket was dried carefully and 500 ml of an inert hydrocarbon diluent having a boiling range of about 170°–180° C. was introduced. The diluent was evacuated at 60° C., purged with nitrogen and evacuated, which treatment effectively reduced the water and oxygen contents of the diluent to below 10 ppm by weight. The diluent was then saturated with propylene to one atmosphere pressure. 5 millimoles of diethyl aluminium chloride was introduced followed by 1 millimole of hexamethylphosphoric triamide and the mixture was stirred for 30 minutes. 2.5 millimoles of $TiCl_3$ (prepared as described) were then introduced. The pressure in the reaction vessel was maintained at one atmosphere by supply of propylene from a burette. After a further 3 hours the run was terminated with 10 milliliters of isopropanol and a sample of the supernatant liquid extracted for determining the concentration of soluble polymer. The solid was filtered and washed three times with petrol ether and dried in a vacuum oven at 120° C. for an hour. The yield of solid plus calculated soluble polymer equalled within experimental error the propylene lost from the burette.

The results obtained are set out in Table 1.

TABLE 1

| Example or Comparative Example | Form of $TiCl_3$[a] | Polymerisation result | |
|---|---|---|---|
| | | Conversion to Solid (gm/mMol Ti)[b] | Yield diluent soluble polymer (%)[c] |
| 1 | EADC | 8.9 | 4.7 |
| A | None | 9.0 | 9.3 |

Notes to Table 1
[a]EADC means treated with ethyl aluminium dichloride. None means not treated with ethyl aluminium dichloride.
[b]Based on solid polymer only.
[c]% based on total polymer (solid + soluble) formed.

EXAMPLES 2 to 15

A titanium trichloride reaction product was obtained by the reaction between titanium tetrachloride and diethyl aluminium chloride as described in Example 1.

The reaction product was then treated with di-isoamyl ether by suspending the reaction product in n-hexane to give a $TiCl_3$ concentration of 760 millimoles/liter and di-isoamyl ether was added at room temperature to give a molar ratio $TiCl_3$ to di-isoamyl ethyl of 1.03. The mixture was heated to 35° C. over a period of 15 minutes and maintained at this temperature for a further hour and then cooled to ambient temperature. The ether treated product was filtered off and washed 5 times with 50 ml portions of n-hexane and then suspended in n-heptane. The suspension in n-heptane was stored at ambient temperature until used.

The ether-treated product was then heated, either in the presence or absence of a solution of ethyl aluminium dichloride containing 1.75 moles of ethyl aluminium monochloride per liter of solution, under conditions as set out in Table 2.

TABLE 2

| Example or Comparative Example | Molar Ratio EADC:T:Cl₃ (d) | Heat Treatment | | |
|---|---|---|---|---|
| | | Solvent (e) | Temp (°C.) | Time (hrs) |
| 2 | 6.13 | E | 65 | 16 |
| 3 | 6.13 | E | 65 | 40 |
| 4 | 6.13 | E | 100 | 1½ |
| 5 | 6.13 | E | 100 | 4.5 |
| 6 | 6.13 | E | 100 | 9 |
| B | NIL | NIL* | 70 | 4 |
| C | NIL | NIL* | 90 | 4 |
| D | NIL | H | 70 | 4 |
| E | NIL | H | 90 | 4 |
| F | NIL | T | 70 | 4 |
| G | NIL | T | 90 | 4 |
| H | NIL | T | 110 | 4 |

Notes to Table 2.
(d)NIL indicates that the $TiCl_3$ component was not treated with EADC, and EADC denotes ethyl aluminium dichloride.
(e)E is a mixture of hydrocarbons (mainly $C_{12}$ isomers) and has a boiling point in the range 170–180° C.
NIL* - the dry ether treated reaction product was heated.
H is n-heptane.
T is toluene.

The various forms of titanium trichloride were then used to polymerise propylene as described in Example 1. In some polymerisation, no Lewis Base component was present, in which case the titanium trichloride component was added immediately after the diethyl aluminium chloride had been added. Details of the polymerisation conditions and the results obtained are set out in Table 3.

TABLE 3

| Example or | Form of TiCl₃ | Amount of | Conversion to Solid | Yield diluent soluble |
|---|---|---|---|---|

| Comparative Example | used (f) | HMPT (mMol) | (gm/mMol Ti) (b) | polymer (%)(c) |
|---|---|---|---|---|
| 7 | 2 | 1.0 | 14.5 | 2.2 |
| 8 | 3 | NIL | 8.96 | 4.1 |
| 9 | 3 | 1.0 | 12.8 | 2.9 |
| 10 | 4 | NIL | 8.6 | 5.3 |
| 11 | 4 | 1.0 | 13.0 | 2.4 |
| 12 | 5 | NIL | 9.44 | 3.5 |
| 13 | 5 | 1.0 | 16.9 | 2.00 |
| 14 | 6 | NIL | 13.0 | 3.8 |
| 15 | 6 | 1.0 | 16.9 | 1.8 |
| J | B | NIL | 3.64 | 13.6 |
| K | C | NIL | NIL | — |
| L | D | NIL | 9.56 | 12.8 |
| M | E | NIL | 4.56 | 14.9 |
| N | F | NIL | 8.9 | 10.7 |
| P | G | NIL | 4.5 | 16.8 |
| Q | H | NIL | NIL | — |
| R | UN | NIL | 12.0 | 22.0 |

Notes to Table 3.
(b)as in Table 1
(c)as in Table 1
(f)2 to 6 and B to H are prepared as described in Table 2. UN is the ether treated catalyst which has been subjected to no further treatment, including heating.

EXAMPLES 16 to 25

The general catalyst preparation described for Examples 2 to 6 was repeated using an ether treated product which had been stored at 0° C. and subsequently treated using different ratios of ethyl aluminium dichloride to titanium trichloride and also different concentrations and diluents. The heat treatment was at 100° C. for 4.5 hours in all cases. The products were then used as described in Examples 7 to 15 to polymerise propylene. The conditions used and the results obtained are summarised in Table 4.

TABLE 4

| | TiCl₃ treatment | | | | Polymerisation | | |
|---|---|---|---|---|---|---|---|
| Example or Comparative Example | EADC conc. (mMol/l) (f) | Molar Ratio EADC:TiCl₃ (f) | Solvent (e) | Amount of HMPT (mMol) | Conversion to Solid (gm/mMol Ti) (b) | Yield diluent soluble polymer (%)(c) | |
| 16 | 1640 | 6:1 | E | NIL | 9.9 | 4.6 | |
| 17 | 1640 | 6:1 | E | 1.0 | 15.8 | 2.5 | |
| 18 | 530 | 2:1 | E | NIL | 13.2 | 3.5 | |
| 19 | 530 | 2:1 | E | 1.0 | 14.7 | 2.7 | |
| 20 | 1750 | 2:1 | E | NIL | 13.3 | 3.2 | |
| 21 | 1750 | 2:1 | E | 1.0 | 15.65 | 2.7 | |
| 22 | 1800 | 6:1 | T | NIL | 14.4 | 3.2 | |
| 23 | 1800 | 6:1 | T | 1.0 | 16.4 | 2.6 | |
| 24 | 3560 | 6:1 | T | NIL | 11.4 | 2.7 | |
| 25 | 3560 | 6:1 | T | 1.0 | 15.6 | 2.0 | |
| S | NIL | NIL | NIL | NIL | 15.1 | 25.2 | |
| T | NIL | NIL | NIL | 1.0 | 8.3 | 8.0 | |

Notes to Table 4.
(b)as in Table 1
(c)as in Table 1
(e)as in Table 2
(f)EADC is ethyl aluminium dichloride

EXAMPLES 26 AND 27

The ether treated product used in Examples 6 to 25 was treated with different alkyl aluminium dihalide compounds.

25 mmol of the suspension of the ether treated product was filtered, dried in a stream of pure nitrogen and a solution of the alkyl aluminium dihalide compound in a high boiling point hydrocarbon diluent was introduced. The mixture was heated to 65° C. and maintained at this temperature with gentle stirring for 16 hours.

The solid was then washed four times with 30 ml portions of n-heptane. The titanium trichloride containing product was then used to polymerise propylene using the conditions as indicated generally for example 1 except that one liter of hydrocarbon diluent was used and the quantities of diethyl aluminium chloride and titanium trichloride were 10 mmol and 5 mmol respectively. As in examples 8, 10, 12 and 14, the catalyst system did not include a Lewis Base component. Other details of the conditions used for the alkyl aluminium dihalide treatment and the polymerisation results are given in Table 5.

TABLE 5

| | Alkyl aluminium dihalide treatment | | | | Polymerisation Result | |
|---|---|---|---|---|---|---|
| Example | Type (g) | Amount (Moles/Mole TiCl₃) | Concentration (moles/liter) | Washing (h) | Conversion to Solid (gm/mMol Ti) (b) | Yield diluent soluble polymer (%)(c) |
| 26 | BuAlCl₂ | 3 | 1.7 | A | 11.5 | 4.9 |
| 27 | HexAlCl₂ | 2 | 1.35 | B | 10.0 | 4.4 |

Notes to Table 5
(b)As in Table 1
(c)As in Table 1
(g)BuAlCl₂ is isobutyl aluminium dichloride
   HexAlCl₂ is isohexyl aluminium dichloride
(h)A - washed twice at 65° C. and then twice at ambient temperature
   B - all four washings at ambient temperature.

We claim:

1. A process for the preparation of a titanium trihalide wherein a titanium tetrahalide is reacted with an organo-aluminium compound to give a titanium trihalide product and this product is treated with an ether of the formula

R'—O—R"

and then at a temperature in the range from 60° C. up to 120° C. for a time of from 10 minutes up to 100 hours, with a solution, in a liquid hydrocarbon of an alkyl aluminium dihalide, the amount of the alkyl aluminium dihalide being from 0.1 up to 100 moles per mole of titanium trihalide present in the titanium trihalide product wherein R' and R" can be the same or different and are alkyl groups containing from 4 up to 10 carbon atoms.

2. The process of claim 1 wherein the amount of alkyl aluminium dihalide is from 2 up to 8 moles per mole of titanium trihalide.

3. The process of claim 1 wherein the solution of the alkyl aluminium dihalide contains from 0.5 up to 3.5 moles of the alkyl aluminium dihalide per liter of liquid hydrocarbon.

4. The process of claim 1 wherein the organo-aluminium compound reacted with the titanium tetrahalide is an aluminium alkyl of the formula $AlR_nX_{3-n}$ where
R is an alkyl group having 1 to 18 carbon atoms;
X is a halogen atom; and
n is from 1.5 up to 2.5.

5. The process of claim 4 wherein the titanium tetrahalide is mixed, at a temperature below 20° C., with from 0.6 up to 1.5 moles, for each mole of the titanium tetrahalide of a dialkyl aluminium halide, or a material including a dialkyl aluminium halide.

6. The process of claim 1 wherein the titanium trihalide product is mixed with the solution of the alkyl aluminium dihalide at ambient temperature and the mixture is then heated to the temperature in the range from 60° C. up to 120° C. which temperature is maintained for from 10 minutes up to 100 hours.

7. The process of claim 1 wherein the titanium trihalide product is separated from the reaction medium before it is treated with the ether; again after it has been treated with the ether and again after it has been treated with the solution of the alkyl aluminium dihalide and each separation step includes a washing stage.

8. The process of claim 1 wherein for each mole of titanium trihalide which is present in the titanium trihalide product there is used at least 0.4 moles of said ether.

9. The process of claim 1 wherein R' and R" contain from 4 to 6 carbon atoms.

10. A process for the preparation of a titanium trihalide wherein a titanium tetrahalide is reacted with an organo-aluminium compound to give a titanium trihalide product and this product is treated with an ether of the formula

R'—O—R"

and then at a temperature in the range from 60° C. up to 120° C. for a time of from 10 minutes up to 100 hours, with a solution, in a liquid hydrocarbon of 0.1 up to 100 moles of an alkyl aluminium dihalide per mole of titanium trihalide wherein R' and R" can be the same or different and are alkyl groups containing from 1 up to 15 carbon atoms.

11. The process according to claim 10 wherein R' and R" contain from 4 to 6 carbon atoms.

12. An olefine polymerisation catalyst comprising
(1) a titanium trihalide component which is the product of the process of claim 1; and
(2) at least one organo-metallic compound of aluminium or of a non-transition metal of Group IA or IIA.

13. The catalyst of claim 12 wherein for each molecular proportion of titanium trihalide which is present in component (1), there is present at least 0.1 molecular proportions of component (2).

14. The catalyst of claim 12 which also includes (3) at least one Lewis Base which is an amine; a cyclic amine; a diamine; an alkanolamine; an amide; urea, thiourea N,N,N',N'tetramethylurea; an organo-phosphorus compound; an ether; an ester; a ketone; an alcohol; a sulphur containing analogue of ethers, esters, ketones and alcohols; or an organosilicon compound.

15. The catalyst of claim 14 wherein for each molecular proportion of titanium trihalide which is present in component (1) there is present from 0.01 up to 10 molecular proportions of component (3) and the amount, in moles, of component (3) is less than the amount, in moles of component (2).

16. The catalyst of claim 12 which also includes (4) at least one substituted or unsubstituted polyene which is 3-methylheptatriene-1,4,6 or a cyclic polyene which is cyclooctatriene; cyclooctatetraene, cycloheptatriene, alkyl or alkoxy substituted cyclic polyenes, tropylium salts, tropylium complexes, tropolone or tropone.

17. The catalyst of claim 16 wherein for each molecular proportion of component (2) there is present from 0.01 up to 1.0 molecular proportions of component (4), and the molecular proportions of component (4) and any Lewis Base which is present as component (3) is less than the molecular proportion of component (2).

18. A process for the polymerisation of olefines wherein at least one mono-α-olefine, or a mixture of at least one mono-α-olefine and ethylene is contacted with the olefine polymerisation catalyst of claim 12.

19. The process of claim 18 wherein the monomer and any diluent, which are of commercial purity, are subjected to a further purification procedure.

* * * * *